United States Patent [19]

Sudnishnikov et al.

[11] Patent Number: 4,947,941

[45] Date of Patent: Aug. 14, 1990

[54] SINGLE-STROKE PNEUMATIC APPARATUS

[75] Inventors: Vadim B. Sudnishnikov; Andrei A. Zelentsov, both of Novosibirsk, U.S.S.R.

[73] Assignee: Institut Gornogo Dela Sibirskogo Otdelenlja Akademii Nauk SSSR, Novosibrisk, U.S.S.R.

[21] Appl. No.: 242,187

[22] PCT Filed: Oct. 21, 1986

[86] PCT No.: PCT/SU86/00103

§ 371 Date: Jun. 20, 1988

§ 102(e) Date: Jun. 20, 1988

[87] PCT Pub. No.: WO88/03079

PCT Pub. Date: May 5, 1988

[51] Int. Cl.[5] .............................................. B23B 45/16

[52] U.S. Cl. ....................................... 173/134; 92/51; 173/13

[58] Field of Search ..................... 173/13, 14, 15, 134; 92/53, 51, 117 R; 91/170 R

[56] References Cited

U.S. PATENT DOCUMENTS

| | | | |
|---|---|---|---|
| 4,658,913 | 4/1987 | Yantsen et al. | 173/13 X |
| 4,693,322 | 9/1987 | Gartside | 173/13 X |

FOREIGN PATENT DOCUMENTS

| | | |
|---|---|---|
| 706239 | 12/1939 | U.S.S.R. . |
| 409845 | 4/1974 | U.S.S.R. . |
| 1027026 | 7/1983 | U.S.S.R. . |
| 2010163 | 6/1979 | United Kingdom . |
| 2084916 | 4/1982 | United Kingdom . |

*Primary Examiner*—Frank T Yost
*Assistant Examiner*—Willmon Fridie, Jr.
*Attorney, Agent, or Firm*—Bruce E. Lilling

[57] ABSTRACT

A single - stroke pneumatic apparatus comprises a hollow cylindrical frame (1) in which is mounted for reciprocating back and forth a striker (2) forming in the frame (1) front and rear chambers (3 and 4), the front chamber (3) has its own inlet and outlet ports (5 and 6) and the rear chamber (4) has its own ports (7 and 8). A directional flow control sleeve (10) fitted outside the frame (1) is arranged to uncover and cover the inlet and outlet ports (5, 6, 7, 8). The directional flow control sleeve (10) is provided with front and rear longitudinal internal passages (11 and 12) and front and rear radial holes (13 and 14).

2 Claims, 1 Drawing Sheet

SINGLE-STROKE PNEUMATIC APPARATUS

BACKGROUND OF THE INVENTION

1. Field of the Invention

The present invention relates to pneumatic apparatus of the percussive type and more particularly to single-stroke pneumatic apparatus.

2. Description of the Prior Art

For marking, centre-pricking, marking-off and chiselling off risers use is commonly made of a single-acting pneumatic apparatus. The tool the apparatus is fitted with varies with the application. It can be a stamp, a prick-punch, a hobby or a chisel supported in a hollow frame with inlet and outlet ports and a striker dividing the bore of the frame into forward- and back-stroke chambers. A directional flow control is provided on the frame. The source of energy is compressed air fed from a mobile or stationary compressor over a flexible hose. In operation, the compressed air admitted into the chambers of the frame with the aid of the directional flow control maniplated by the operator, causes the striker to reciprocate back and forth axially and deliver cyclewise blows at the end face of the tool. The work done by the tool materializes in any of the following operations depending on tool type: marking, centre-pricking, chiselling or riveting.

The apparatus is a manually-operated one and must therefore be reliable in operation and create unstrained labour conditions. The degree of its engineering perfection is determined, among other things, by the apparatus capacity, i.e. by the energy of the blows.

Known in the art is a single-stroke pneumatic apparatus (cf. USSR Inventor's Certificate No. 706,239, IPC B25D 9/04, 1979) in the hollow cylindrical frame, of which there is located a tool at an end with provision for back and forth reciprocation of a striker with a tail piece and a callibrated orifice. The striker divides the bore of the frame into fore and back chambers communicating with each other by way of the calibrated orifice. A spring-loaded head with a tip in the form of a valve is provided at the forward end of the frame, and a cover is provided at the rear end of the frame.

The striker and its tail piece interacting with the cover of the frame and the calibrated orifice through which the fore and back chambers communicate are additional sources of friction which diminish the energy of blows. Some of the energy is also lost due to leaks of compressed air from the fore chamber into the back one during operation.

Also known is a single-stroke pneumatic apparatus (cf. USSR Inventor's Certificate No. 1,027,026, IPC B25 D 9/04, 1983) comprising a hollow cylindrical frame having a strating means, inlet and outlet ports overlapped in turn by a directional flow control sleeve. The frame contains a striker and has a tool mounted at the front end thereof. The striker divides the bore of the frame into fore and back chambers. The directional flow control sleeve has inlet passages in the form of longitudinal flats which hamper the high-velocity flow of compressed air into the fore chamber. The speed of the striker consequently decreases and so does the energy of the blow.

The starting means provided in the form of a valve which can be set open only by pressing the tool against the work strains the operator who starts the apparatus with effort.

SUMMARY OF THE INVENTION

The main object of the present invention is to provide a single-stroke pneumatic apparatus that features improved operating conditions and higher energy of a single stroke due to an appropriate construction arrangement of its air-directional flow control means.

The essence of the invention consists in a single-stroke pneumatic apparatus comprising a hollow cylindrical frame, a tool mounted in the forward end of the frame and a striker is reciprocally arranged inside the frame so as to form front and rear chambers in the frame which alternately communicate with a line of compressed gaseous fluid and with the atmosphere via inlet and outlet ports in the frame which, in their turn, are alternately overlapped by a directional flow control sleeve when this arrives into either of its extremities. According to the invention the front and rear chambers have inlet and outlet ports of their own through the frame, the directional flow control sleeve being fitted outside the frame with provision for displacement and has internal longitudinal passages at its forward and rearward ends through which the inlet ports of the front chamber are recurrently connected to the line with compressed gaseous fluid. The sleeve is also provided with radial holes at its forward and rearward ends which are alternately overlapped by the frame so as to place the front chamber in communication with the atmosphere via its outlet ports and the rear chamber with the line with compressed gaseous fluid via its inlet ports when the directional flow control sleeve is set into one of its extremities and place the front chamber in communication with the line of compressed gaseous fluid via its inlet ports and the rear chamber, with the atmosphere via its outlet ports when the directional flow control sleeve is set into its other extremity.

The apparatus designed on the above lines poses no problems in operation. No effort is required for starting it up.

It is expedient that the inlet ports of the rear chamber and the outlet ports of the front chamber are provided in the form of transverse slots.

The ports of such a configuration sharply increase the velocity of the compressed gaseous fluid entering the rear chamber and that of the fluid escaping from the front chamber. This leads to augmenting the energy of blow.

BRIEF DESCRIPTION OF THE DRAWINGS

A preferred embodiment of the invention will now be described by way of example with reference to the accompanying drawings in which.

DESCRIPTION OF A PREFERRED EMBODIMENT

Figure 1:
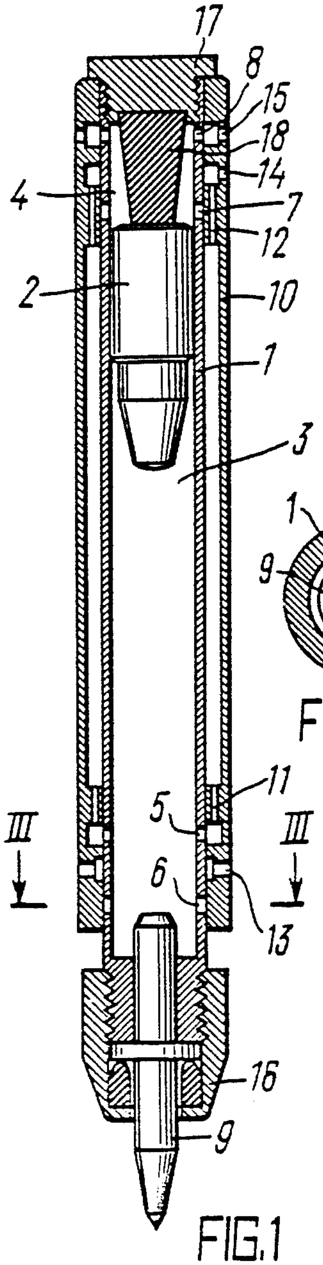
FIG. 1 is a schematic sectional elevation of a single-stroke pneumatic apparatus according to the invention with the striker set into the topmost position.
Figure 2:
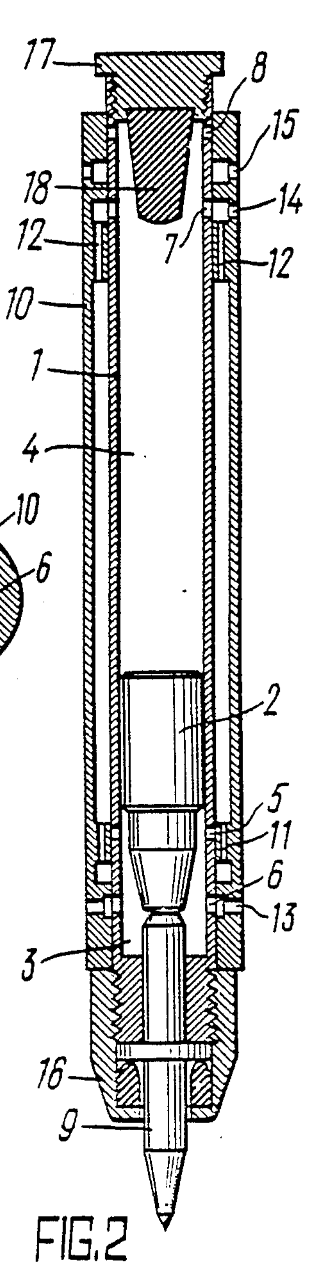
FIG. 2 is a schematic sectional elevation of a single-stroke pneumatic apparatus according to the invention with the striker set into the lowermost position.

Referring to FIGS. 1 and 2, a hollow cylindrical frame 1 of a single-stroke pneumatic apparatus contains, with provision for reciprocating back and forth, a striker 2 which forms a front chamber 3 and a rear chamber 4 in a bore of the frame 1. The front chamber 3 has inlet ports 5 and outlet ports 6 of its own, and the rear chamber 4 has inlet ports 7 and outlet ports 8 of its own all of which extend through the wall of the frame 1. A tool 9 is mounted in one forward end of the frame 1. A directional flow control sleeve 10 is provided outside the frame 1 coaxially therewith and with provision for displacing with respect thereto. The directional flow control sleeve 10 has longitudinal internal passages 11, 12 at its forward and rearward ends respectively. The sleeve 10 is also provided with forward radial holes 13 and with rearward radial holes 14, 15. A cap 16 giving support to the tool 9 is provided at the forward end of the frame, and a cap 17 fitted whereto is a shock-absorbing stop 18 is provided at the rearward end of the frame 1.

The inlet ports 7 of the rear chamber 4 and the outlet ports 6 of the front chamber 3 are provided in the form of transverse slots.

In operation, compressed gaseous fluid is admitted into the front chamber 3 through the rearward radial holes 14 of the directional flow control sleeve 10 set into its topmost position (FIG. 1), through the longitudinal passages 12, 11 and the inlet ports 5. The striker 2 is acted upon by the compressed gaseous fluid in the front chamber 3 rises into its topmost position and, contacting the shock-absorbing stop 18, comes there to a halt before being triggered. The rear chamber 4 communicates with the atmosphere via the outlet ports 8 and the rear ward radial holes 15 at this stage. When the directional flow control sleeve 10 (FIG. 2) displaces with respect to the frame 1 into its lowermost position, contacting the cap 16, it overlaps the inlet ports 5 and the outlet ports 8 and uncovers the inlet ports 7 and the outlet ports 6 of the frame 1. The front chamber 3 becomes connectred to the atmosphere through the outlet ports 6 and the forward radial holes 13, and compresses gaseous fluid enters the rear chamber 4 through the rearward radial holes 14 and the inlet ports 7. A pressure buildup in the rear chamber 4 causes the striker 2 to deliver a blow at the tool 9 which preforms work. After the stoke, the directional flow control sleeve 10 is shifted upwards with respect to the frame 1 into its topmost position, abutting against the cap 17, whereby it overlaps the outlet ports 6 and the inlet ports 7 and uncovers the inlet ports 5 and the outlet ports 8. Compressed gaseous fluid enters the front chamber 3 via the rearward radial holes 14, the longitudinal passages 12, 11 and the inlet ports 5. The rear chamber 4 is connected to the atmosphere via the outlet ports 8 and the rearward radial holes 15 at the same time. Acted upon by the compressed gaseous fluid in the front chamber 3, the striker rises into its topmost position where it comes to a halt in contact with the shock-absorbing stop 18 until the next operating cycle.

Figure 3:
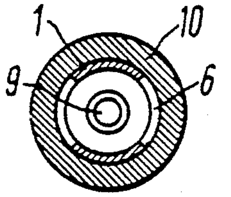
FIG. 3 is a section on line III-III of FIG. 1.

The inlet and outlet ports 7 and 6 (FIG. 3) are provided in the form of transverse slots which give rise to a high-velocity inflow of the compressed gaseous fluid into the rear chamber 4 by way of the inlet ports 7 and a high-velocity outflow of the fluid from the front chamber 3 into the atmosphere by way of the outlet ports 6 when the directional flow control sleeve 10 is in its lowermost position at the cap 16 and the striker 2 is on a downstroke.

Unlike the known single-stroke pneumatic apparatus, the disclosed one starts instantly and without effort.

The above-mentioned advantages provide improvement of operation and increase for a 5–10% the energy of blow without an increase in overall dimensions.

The invention can be used to advantage in coping with such jobs as marking, centre-pricking, marking-off, riveting and chiselling off risers.

It may also be of utility in trimming roofs of mike openings, breaking concrete, punching holes and dealing with other civil engineering applications.

We claim:

1. A single-stoke pneumatic apparatus, comprising a hollow cylindrical frame (1) in the forward end of which is mounted a tool (9); a striker (2) mounted for reciprocation back and forth so as to define front (3) and rear (4) chambers at the forward and rear ends of said frame (1) which alternately communicate with a line of compressed gaseous fluid and with the atmosphere via frame inlet (5,7) and outlet (6,8) ports, respectively, made in said frame (1); a directional flow control sleeve (10) coaxially mounted for a slidable movement between two extreme positions with respect to said frame when said control sleeve is moved into either of its extreme positions for opening and closing said frame inlet (5,7) and outlet (6,8) ports, while the directional flow control sleeve (1) is fitted outside the frame (1) for axial displacement and defines axial internal longitudinal passages (11,12) through which compressed gaseous fluid is periodically supplied into the front chamber (3) through the inlet ports (5) and front radial holes (13) and rearward radial holes (14,15) made respectively in the forward and rearward ends of the direcitonal flow control sleeve (10) and alternatively covered by the frame (1) so that at one extreme position of the directional flow control sleeve (1) the forward chamber (3) communicates through its outlet ports (6) with the atmosphere, while the rearward chamber (4) receives compressed gaseous fluid through the inlet ports (7) and at the other extreme position of the directional flow control sleeve (10) the frontward chamber (3) communicates through its inlet ports (5) with a compressed gaseous fluid, while the rearward chamber (4) communicates through its outlet ports (8) with the atmosphere.

2. An apparatus as claimed in claim 1, characterized in that inlet ports (7) of the rearward chamber (4) and outlet ports (6) of the frontward chamber (3) are shaped as transverse slots.

* * * * *